United States Patent
Hartmann et al.

(10) Patent No.: US 6,170,901 B1
(45) Date of Patent: Jan. 9, 2001

(54) COVERING ARRANGEMENT SUCH AS A SOFT TOP FOR A MOTOR VEHICLE

(75) Inventors: Ludwig Hartmann, Rieden; Rudolf Kastner, Kümmersbruck, both of (DE)

(73) Assignee: Grammer Formteile GmbH, Kummersbruck (DE)

( * ) Notice: Under 35 U.S.C. 154(b), the term of this patent shall be extended for 0 days.

(21) Appl. No.: 09/552,213

(22) Filed: Apr. 19, 2000

Related U.S. Application Data

(62) Division of application No. 09/088,219, filed on Jun. 1, 1998, now Pat. No. 6,082,807.

(30) Foreign Application Priority Data

Nov. 6, 1997 (DE) .............................. 197 24 592

(51) Int. Cl.$^7$ ...................................................... B60J 7/00
(52) U.S. Cl. .......................... 296/107.01; 296/107.11; 296/121; 296/100.16; 296/100.07
(58) Field of Search ................ 296/107.01, 107.11, 296/121, 102, 100.16, 107.07, 146.14; 160/371, 383

(56) References Cited

U.S. PATENT DOCUMENTS

| | | | |
|---|---|---|---|
| 1,055,489 | * 3/1913 | Pendery | 296/100.16 |
| 1,298,836 | * 4/1919 | Vetter | 296/107.11 |
| 1,567,674 | * 12/1925 | Pease et al. | 296/100.16 |
| 2,836,457 | * 5/1958 | Berman | 296/107.07 |
| 2,943,760 | * 7/1960 | Hamilton | 296/100.16 |
| 3,028,194 | 4/1962 | Werner . | |
| 3,090,646 | * 5/1963 | Johnson | 296/107.11 |
| 3,237,983 | * 3/1966 | Hollar | 296/107.11 |
| 3,672,078 | 6/1972 | Fukuoka . | |
| 3,752,209 | * 8/1973 | Swanson | 160/371 |
| 3,774,959 | * 11/1973 | Brudy | 296/121 |
| 4,595,230 | * 6/1986 | Fettes | 296/102 |
| 4,991,640 | * 2/1991 | Verkindt et al. | 160/383 |
| 5,033,787 | * 7/1991 | Takada | 296/102 |
| 5,058,652 | * 10/1991 | Wheatley et al. | 296/100.16 |
| 5,076,338 | * 12/1991 | Schmeichel et al. | 296/100.16 |
| 5,203,055 | * 4/1993 | Broadwater | 296/100.16 |
| 5,540,476 | * 7/1996 | Cowsert | 296/104.07 |
| 5,737,893 | * 4/1998 | Rossiter et al. | 160/371 |
| 5,829,820 | * 11/1998 | Cowsert | 296/107.11 |
| 5,887,936 | * 3/1999 | Cowsert | 296/107.07 |
| 6,082,807 | * 7/2000 | Hartman et al. | 296/107.07 |

FOREIGN PATENT DOCUMENTS

| | | |
|---|---|---|
| 40 40 173A1 | 6/1992 | (DE) . |
| 44 41 266C1 | 11/1995 | (DE) . |
| 0 145 812 | 6/1985 | (EP) . |

* cited by examiner

*Primary Examiner*—Joseph D. Pape
*Assistant Examiner*—Kiran Patel
(74) *Attorney, Agent, or Firm*—Herbert Dubno

(57) ABSTRACT

A covering arrangement such as a soft top for a motor vehicle comprises a surface element such as a soft top element connected to another structural element which is in the form of a second surface element, or a roof channel or gutter, or a window pane member, or a frame linkage assembly member. The first-mentioned surface element and the other structural element are connected together by means of a strip-shaped PUR-casting resin bead element.

2 Claims, 4 Drawing Sheets

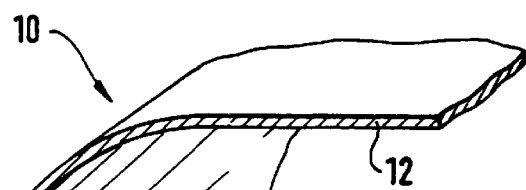
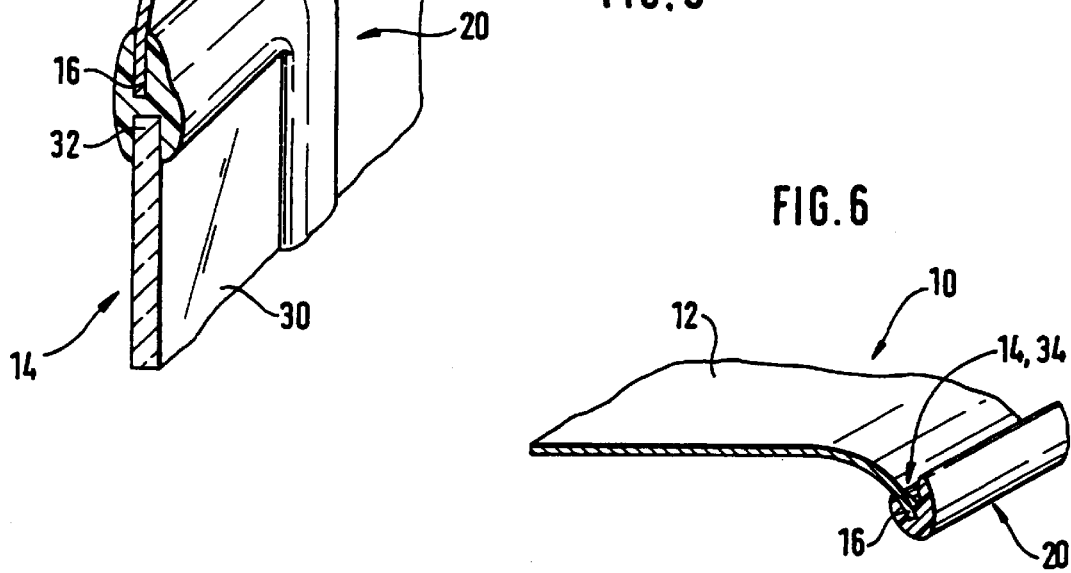
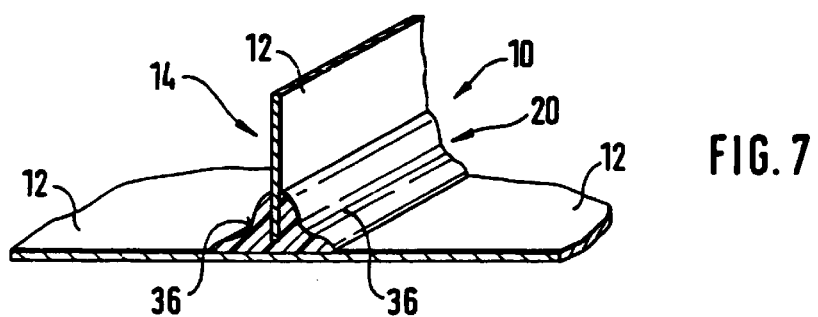
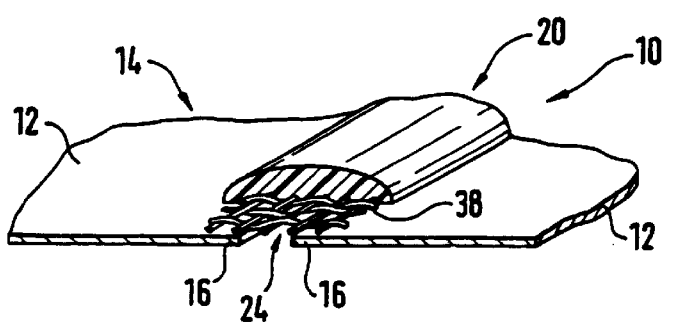

US 6,170,901 B1

COVERING ARRANGEMENT SUCH AS A SOFT TOP FOR A MOTOR VEHICLE

CROSS REFERENCE TO RELATED APPLICATION

This application is a division of application Ser. No. 09/088,219 filed Jun. 1, 1998 and now U.S. Pat. No. 6,082,807.

FIELD OF THE INVENTION

The present invention relates to a covering arrangement, more especially for example a soft top for a motor vehicle. Such a top may also be referred to as a drop head or cabriolet top.

BACKGROUND OF THE INVENTION

One form of a soft top for a motor vehicle comprises a soft top surface element such as a portion of canvas or like material which is connected to another structural element of the assembly which may be for example a second soft top surface element which hitherto is generally sewn to the first soft top surface element. As an example in this respect reference may be made to FIG. 2 of U.S. Pat. No. 3,028,194.

In order to seal off the sewn seams, such a soft top is usually sealed off at the inside surface thereof in the region of the sewing, for example by means of a suitable sealing material which can be applied by spreading or painting thereon. Sewing the soft top elements together and sealing them off along the common connecting seam represents a not inconsiderable amount of work and thus a significant cost factor.

OBJECTS OF THE INVENTION

An object of the present invention is to provide a soft top for a motor vehicle, which can be produced in a comparatively simple manner.

Another object of the present invention is to provide a soft top for a motor vehicle, such as to afford enhanced versatility in terms of design configuration.

Still another object of the present invention is to provide a soft top for a motor vehicle which is of a simple but nonetheless functionally reliable and acceptable nature involving a simple production procedure by virtue of its design.

SUMMARY OF THE INVENTION

In accordance with the principles of the present invention the foregoing and other objects are achieved by a soft top for a motor vehicle, including a first soft top surface element and a structural element connected thereto. The structural element comprises a second soft top surface element and the first and second soft top surface elements are connected together by a polyurethane casting resin bead element of strip configuration.

The abbreviation PUR will be generally used hereinafter to denote polyurethane.

In another aspect of the present invention the foregoing and other objects are attained by a soft top for a motor vehicle, including a first soft top surface element and a PUR-casting resin bead element connected to the first soft top surface element, the bead element comprising a roof channel or gutter as an integral component thereof.

In still another aspect of the invention the foregoing and other objects are achieved by a soft top for a motor vehicle, including a first soft top surface element and a first structural element comprising a soft top window or rear window, and a PUR-casting resin bead element of strip configuration connecting the window and the soft top surface element together.

In still a further aspect of the invention the foregoing and other objects are achieved by a soft top for a motor vehicle, including a first soft top surface element and a first structural element comprising a soft top frame linkage member, with a PUR-casting resin bead element enclosing said linkage member and connected to said soft top surface element.

As will be apparent from the description hereinafter of preferred embodiments of the soft top arrangement in accordance with the present invention, to produce such a soft top according to the invention it is only necessary for the first soft top surface element and the other structural element co-operating therewith to be appropriately fitted into a tool of a suitable configuration, for the tool to be sealingly closed, and for the PUR-casting resin to be introduced into a mold cavity defined by the tool in the closed condition. After reaction of the PUR-casting resin the casting mold defined by the tool can be opened and the corresponding soft top or soft top portion can be removed therefrom. This procedure therefore affords the advantage that there is no need of a sewing operation to connect the components together and a coating operation for sealing off the sewn seam or seams. A further advantage of the soft top designed in accordance with the invention is that the result of the described operation, that is to say the casting procedure, is very clean and neat and can be accurately reproduced at any time. Furthermore there is no need of especially qualified operators in order to produce the soft top in accordance with the invention. Of course, the bead is then simultaneously applied to both the soft-top and the structural elements.

In accordance with a preferred feature of the invention the first and second soft top surface elements are disposed in mutually aligned relationship with each other for connection thereof. Likewise it is possible in an alternative preferred feature for the second soft top surface element to project away from the first soft top surface element at a given angle which can be for example about 90°. It will be noted however that this angle may also be of any other suitable value, depending on the respective circumstances involved.

The PUR-casting resin bead element in strip form affords a firm strong connection between the respectively associated components. The strength of the connection between the associated soft top elements is advantageously further improved in accordance with a preferred feature of the invention if, in a soft top according to the invention, the mutually facing edges of the soft top surface elements are spaced from each other and are provided with anchoring holes, with the PUR-casting resin bead element covering over the edges of the soft top surface elements to a position over the anchoring holes. In that case the PUR-casting resin passes through the anchoring holes whereby the mechanical strength of the connection between the cooperating soft top elements is correspondingly improved.

In a preferred feature of the soft top according to the invention the PUR-casting resin bead element covers the edges of the two soft top elements on both sides thereof. In that case the PUR-casting resin bead element may be of an at least approximately symmetrical cross-sectional profile in relation to the soft top elements. It is however also possible for the bead element to be formed on one side with a hinge groove or channel, thereby defining a substantially kidney-shaped cross-sectional configuration constituting a hinge portion. Such a construction is used in particular where it is desirable for the interconnected soft top elements to be folded together simply and accurately as desired.

In a soft top for a motor vehicle with first and second adjacent soft top elements, it may be desirable if the edges of the first and second soft top elements are connected together by means of a strip-shaped connecting element covered by the PUR-casting resin bead element. In that case the strip-shaped connecting element can be covered on one side by the bead element so that the connecting element is visible from the other side, but it is also possible for the bead element to cover the strip-shaped connecting element on both sides thereof so that the latter is invisible.

In accordance with another preferred feature of the invention the strip-shaped connecting element referred to above can be formed by a woven or braided strip. Such a connecting element may be for example a glass fiber cloth portion, a metal braid portion or the like. It will be appreciated that the strip-shaped connecting element can also be in the form of a net or mesh portion. When the soft top according to the invention includes strip-shaped connecting elements of that kind, which can be for example glued to the two soft top surface elements, it is possible to avoid shrinkage in the region of the connection between the two soft top surface elements. When the reaction of the PUR-casting resin occurs, there is a shrinkage effect which can be of the order of magnitude of about 1%. By virtue of the provision of the above-mentioned strip-shaped connecting element in the form of a woven or braided strip, it is possible to eliminate such a shrinkage effect and thus to provide for stabilization of the PUR-casting resin bead element. In that way it is possible for example to avoid undesirable fold formation in the connecting region of the two soft top surface elements. The same advantageous results can also be achieved for example by the strip-shaped connecting element being formed by a clamp strip or a lattice strip from which press studs project at least on one side thereof. Another advantageous feature of the invention provides that the strip-shaped connecting element is formed by first and second interlocked or interlaced wire loop or wire corrugation elements.

It is also possible in accordance with another preferred feature of the invention for the edges of the soft top surface elements to be provided alternately with anchoring holes and with anchoring portions which are engageable therein.

In regard to the configuration of the soft top in accordance with the present invention as outlined hereinbefore in which the bead element comprises a roof channel as an integral component thereof, to which the first soft top surface element is connected, such a design configuration affords the advantage that the roof channel can be produced directly, which is desirable in terms of aspects relating to manufacture and the costs arising therefrom.

In regard to the soft top construction according to the invention as outlined above in which the first structural element comprises a window connected to the soft top surface element by means of the PUR-casting resin bead element, it will be noted that it is possible to use in that case as desired any PUR-casting resin system enjoying a given level of hardness or softness. For example the PUR-casting resin system may have a shore hardness A of the order of magnitude of 60. As desired the PUR-casting resin system may be suitably colored and may have a light fastness of between stages 6 and 7 in accordance with the German Standard DIN 75 002.

The soft top or rear window of the soft top arrangement according to the invention can be glued into the PUR-casting resin bead element or can be cast directly therewith.

In accordance with another feature of the invention the PUR-casting resin bead element can be produced by means of a single-phase casting process. It is however also possible for the PUR-casting resin bead element to be produced in a two-phase casting process or a multi-phase process, that is to say for example in a molding tool with interchangeable mold portions or cover portions. That advantageously permits the implementation of a large number of different design configurations for the soft top. Furthermore it is possible for the PUR-casting resin bead element to be in the form of a surface reinforcement or a surface stiffening means for a respective soft top surface element. That also can be produced for example by a per se known single-phase casting process or in a known two-phase or multi-phase casting process. Different casting resins may be employed in such processes.

Further objects, features and advantages of a covering arrangement more specifically in the form of a soft top for a motor vehicle according to the present invention will be apparent from the following description of preferred embodiments thereof.

BRIEF DESCRIPTION OF THE DRAWING

The above and other objects, features, and advantages will become more readily apparent from the following description, reference being made to the accompanying drawing in which:

FIG. 5 is a perspective view in section of part of a fifth embodiment of a soft top according to the invention;

FIG. 6 is a perspective view in section of part of a sixth embodiment of a soft top according to the invention;

FIG. 7 is a perspective view in section of part of a seventh embodiment of a soft top according to the invention;

FIG. 8 is a similar view to FIG. 7 of an eighth embodiment of a soft top according to the invention;

DESCRIPTION OF PREFERRED EMBODIMENTS

It will be noted that the FIGS. of the accompanying drawing are diagrammatic views of parts of embodiments of a soft top in accordance with the invention.

Figure 1:
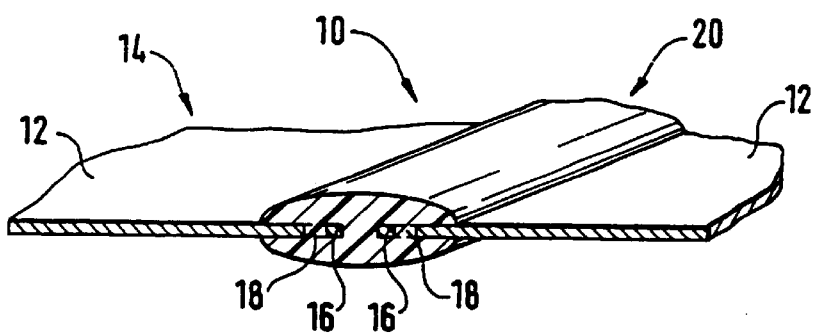
FIG. 1 is a perspective view in partial section of part of a first embodiment of a soft top according to the invention.

Referring therefore firstly to FIG. 1, shown therein in section is part of a first embodiment of an arrangement according to the invention in the form of a soft top as indicated at 10 for a motor vehicle, in particular for a private motor vehicle, comprising a first soft top, surface element 12 and another structural element as indicated at 14 which is also formed by a second soft top surface element. As the second soft top surface element is the same or similar to the first soft top surface element 12, the second soft top surface element is also indicated by reference numeral 12 in the drawing. The first and second soft top surface elements 12 are disposed in mutually aligned relationship. The mutually facing edges as indicated at 16 thereof are at a small spacing from each other and are each provided with anchoring holes as diagrammatically indicated at 18. It will be appreciated that the edges 16 of the soft top surface elements 12 may also be disposed in mutually overlapping relationship.

The two soft top surface elements 12 are mechanically firmly and sealingly connected together by means of a PUR-casting resin bead element as indicated generally at 20, of an elongate strip-shaped configuration. The bead element 20 covers over the edges 16 of the soft top surface elements 12 to a position over the anchoring holes 18, and it is of such a configuration that it affords an at least approximately symmetrical cross-sectional profile in relation to the mutually aligned soft top surface elements 12.

Figure 2:
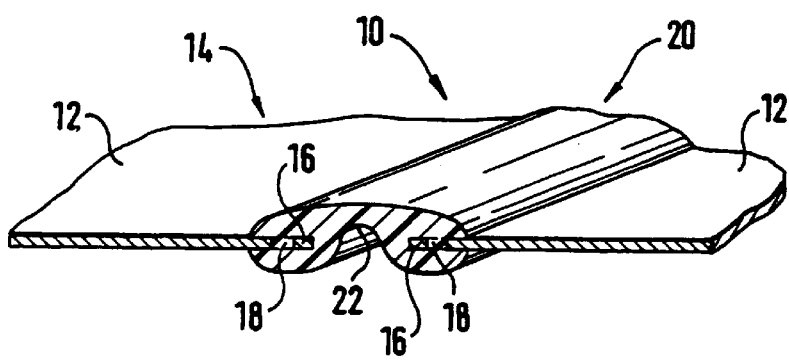
FIG. 2 is a similar view to FIG. 1 of a second embodiment of a soft top according to the invention.

Reference will now be made to FIG. 2 showing an embodiment, which is generally similar to that shown in FIG. 1, for which reason the same parts and components are indicated in FIG. 2 by the same references as those used in FIG. 1. It will be seen from FIG. 2 that the embodiment illustrated therein has a PUR-casting resin bead element 20 which is formed on one side with a hinge groove or channel 22, thus imparting a substantially kidney-shaped cross-sectional configuration to the bead element 20 which thus constitutes a form of hinge portion to permit pivotal movement of the soft top surface elements 12 relative to each other about the hinge groove or channel 22.

Figure 3:
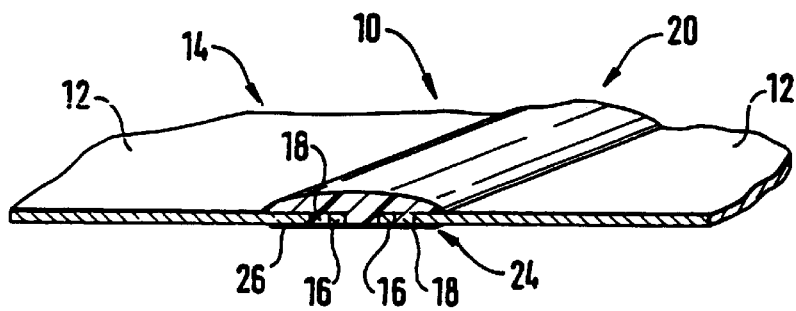
FIG. 3 is a similar view to FIG. 1 of a third embodiment of the soft top according to the invention.

Referring to FIG. 3, shown therein is a part of a soft top 10 with a first soft top surface element 12 and another structural element 14 which is also formed by a second soft top surface element 12, wherein the two soft top surface elements 12 are aligned with each other and are connected together by means of a connecting element 24 of strip-shaped configuration. The strip connecting element 24 can be formed for example by a textile woven cloth or braid as indicated at 26 which is secured for example by sewing or gluing to the edges 16 of the two adjacent soft top surface elements 12. The connecting element 24 is disposed at the inside of the soft top 10. Provided on the outside of the soft top 10 is the PUR-casting resin bead element 20 which covers over the edges 16 of the soft top surface elements 12. In the FIG. 3 embodiment of the soft top 10 the edges 16 are also provided with spaced-apart anchoring holes 18 which are covered over by the PUR-casting resin bead element 20.

Figure 4:
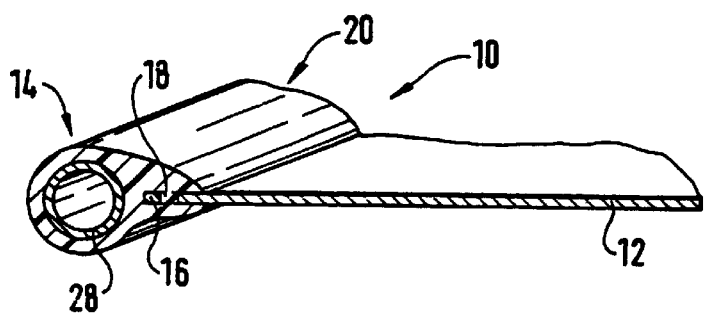
FIG. 4 is a similar view to FIG. 1 of a fourth embodiment of the soft top according to the invention.

FIG. 4 shows an embodiment of the soft top 10 in which a soft top surface element 12 is combined with another structural element 14 formed by a frame assembly linkage member 28 of the soft top 10. The member 28 is mechanically firmly and sealingly connected to the soft top surface element 12 by means of a PUR-casting resin bead element 20. For that purpose the edge 16 of the soft top surface element 12 is for example again provided with spaced-apart anchoring holes diagrammatically indicated at 18. The bead element 20 covers the edge 16 of the soft top surface element 12 to such an extent that the anchoring holes 18 are covered by the bead element 20. It will be clear from FIG. 4 that the member 28 is enclosed by the bead element 20 which for example is cast therearound.

Referring now to FIG. 5, shown therein is an embodiment of the soft top 10 wherein a soft top surface element 12 is combined with another structural element 14 formed by a soft top or rear window of which a part is diagrammatically indicated at 30. The soft top or rear window 30 is mechanically firmly and sealingly connected to the soft top surface element 12 by means of a PUR-casting resin bead element 20. The bead element 20 mechanically firmly and sealingly embraces the edges 16 of the soft top surface element 12 and the edge 32, which is adjacent thereto, of the window 30, at both sides thereof, that is to say both on the inside and the outside thereof.

Reference is now made to FIG. 6 showing an embodiment of the soft top 10 in which a soft top surface element 12 is directly combined with a roof channel or gutter of which a part is diagrammatically indicated at 34. In that arrangement the roof channel 34 is an integral component of an elongate strip-shaped PUR-casting resin bead element 20 which is mechanically firmly and sealingly fixed to the edge 16 of the soft top surface element 12. In this case therefore the roof channel 34 forms the other structural element 14, which has already been referred to on a number of occasions hereinbefore as constituting part of the soft top arrangement according to the invention.

Referring now to FIG. 7, shown therein is part of an embodiment of a soft top 10 according to the invention with a soft top surface element 12 from which a second soft top surface element 12 projects away at an angle for example of 90°. The second soft top surface element 12 thus constitutes the other structural element 14 which has already been referred to hereinbefore. The two soft top surface elements 12 are mechanically firmly and sealingly connected by means of an elongate strip-shaped PUR-casting resin bead element 20 which is formed with two concave fillet portions as indicated at 36.

FIG. 8 shows an embodiment of a soft top 10 according to the invention with first and second soft top surface elements 12, similarly to FIGS. 1, 2 and 3. FIG. 8 also shows that a strip-shaped connecting element 24 is mounted to or fixed to the mutually adjacent edges 16 of the soft top surface elements 12 which are disposed at a slight spacing from each other. The connecting element 24 is formed for example by a woven or braided strip as indicated at 38. The strip 38 is covered over by a strip-shaped PUR-casting resin bead element 20 by means of which the first and second soft top surface elements 12 are firmly and sealingly connected together. The strip 38 is covered over by a strip-shaped PUR-casting resin bead element 20 by means of which the first and second soft top surface elements 12 are firmly and sealingly connected together. The strip 38 provides for eliminating the contraction effect caused by shrinkage of the PUR-casting resin bead element 20, of the order of magnitude of about 1%, so that fold formation caused by shrinkage of the bead element 20, along the edges of the soft top surface elements 12, can be reliably prevented in that simple fashion. The bead element 20 can cover over the edges 16 of the first and second soft top surface elements 12 at one side or preferably both sides thereof, in a suitable fashion.

Figure 9:
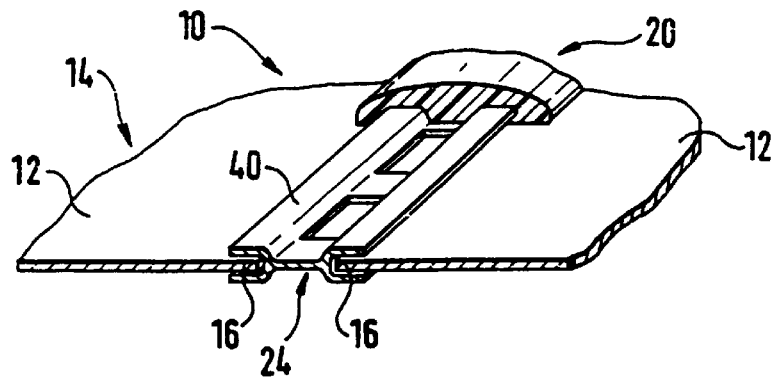
FIG. 9 is a similar view to FIG. 7 of a further alternative form of a soft top according to the invention.

Referring to FIG. 9, shown therein is part of an embodiment of the soft top 10 according to the invention, which differs from the embodiment illustrated in FIG. 8 in particular insofar as the strip-shaped connecting element 24 between the two soft top surface elements 12 is formed by a clipping or clamping strip as diagrammatically indicated at 40, which for example comprises a suitable plastic material. The clipping strip 40 can be of such a configuration that in this case also shrinkage and thus folding along the edges 16 of the soft top surface elements 12 is at least very substantially prevented. An elongate strip-shaped PUR-casting resin bead element 20 also covers over the edges 16 of the soft top surface elements 12 and the strip-shaped connecting element 24 which couples the edges 16 together, in the configuration of the virtually endless clipping strip 40.

Figure 10:
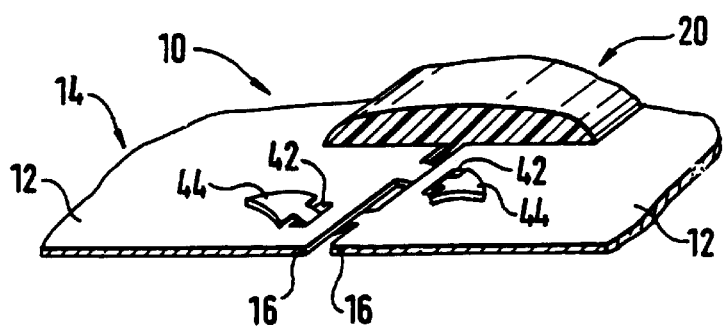
FIG. 10 is a similar view to FIG. 7 of a tenth embodiment of a soft top according to the invention.

FIG. 10 shows a further embodiment of a soft top 10 according to the invention in which first and second soft top surface elements 12 are formed along their mutually facing edges 16 alternately with anchoring holes 42 and anchoring portions 44 which can be respectively fitted therein. The anchoring portions 44 can form integral components of the soft top surface elements 12. In this embodiment also the soft top surface elements 12 are mechanically firmly and sealingly joined together by means of an elongate strip-shaped PUR-casting resin bead element 20.

Figure 11:
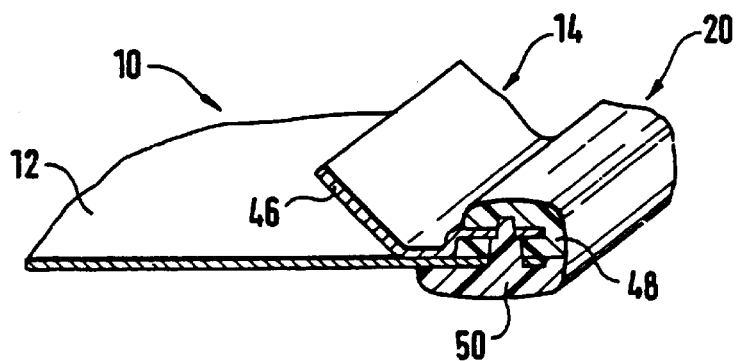
FIG. 11 is a similar view to FIG. 7 of an eleventh embodiment of a soft top according to the invention.

Looking at FIG. 11, the embodiment illustrated therein of a soft top 10 according to the invention combines a soft top surface element 12 with another structural element 14, being therefore firmly and sealingly connected thereto. The element 14 is formed for example by a fixing strip 46 of plastic material. The element 14 can, for example, also have press studs, snap catches, a hook-and-loop strip or the like. It is mechanically firmly and sealingly connected to the soft top surface element 12 by a two-component casting process in which two suitable casting mold halves or portions are successively used in order in a first molding step to produce a first component 48 and immediately thereafter in the same molding tool a second component 50 which are mechanically firmly and sealingly connected to each other and to the soft top surface element 12 and the other element 14 and which together form the PUR-casting resin bead element 20.

Figure 12:
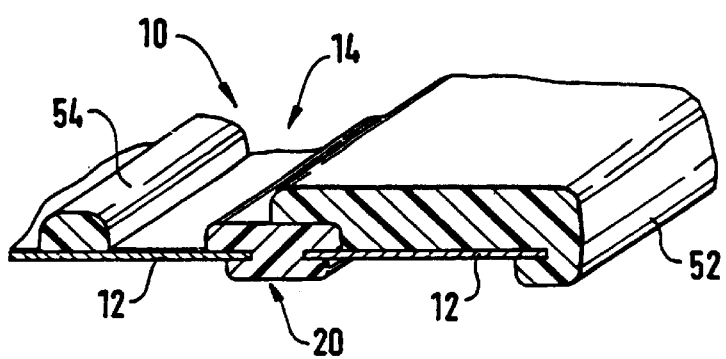
FIG. 12 is a perspective view in section of part of a twelfth embodiment of a soft top according to the invention.

FIG. 12 is a diagrammatic view of part of an embodiment of a soft top 10 according to the invention comprising first and second mutually aligned soft top surface elements 12 which are mechanically firmly and sealingly connected together by means of a PUR-casting resin bead element 20. The soft top surface element 12 which is shown on the right-hand side in FIG. 12 is provided with a PUR-casting resin surface reinforcement 52 while the element 12 of which part is shown on the left-hand side in FIG. 12 is provided with a PUR-casting resin surface stiffening means 54.

Figure 13:
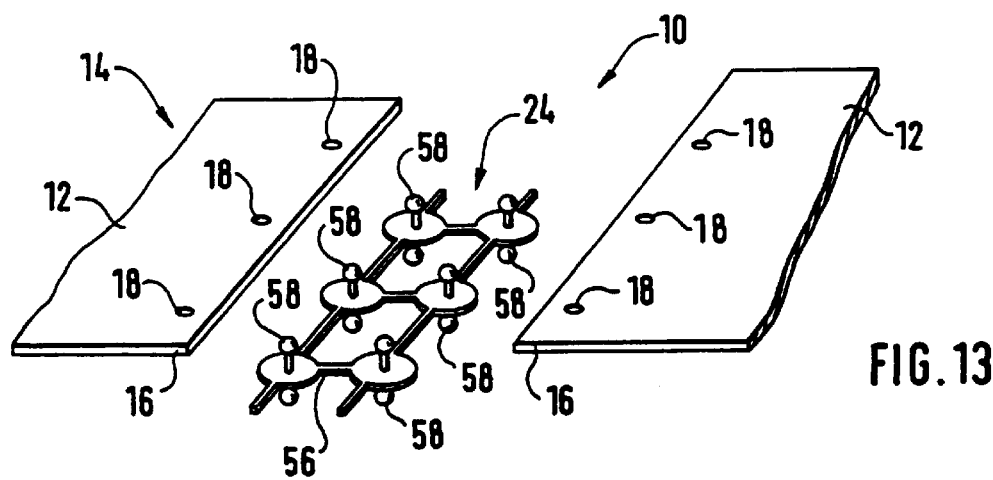
FIG. 13 is a perspective exploded view of a thirteenth embodiment of a soft top according to the invention.
Figure 14:
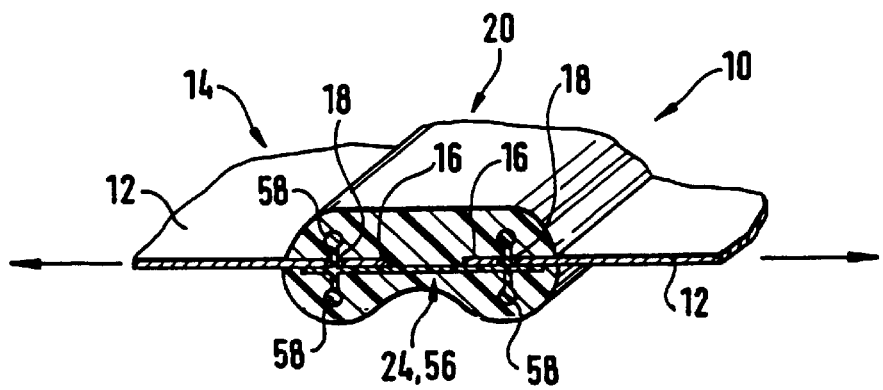
FIG. 14 is a perspective view in section of a part of the construction shown in FIG. 13 in the assembled condition.

Referring now to FIGS. 13 and 14, illustrated therein is a further embodiment of a soft top 10 according to the invention comprising first and second mutually aligned soft top surface elements 12 which are provided with anchoring holes 18 along their respective mutually facing edges 16. Provided for mechanically connecting the adjacent soft top surface elements 12 is a strip-shaped connecting element 24 formed by a lattice strip 56 from which press studs 58 project at both sides thereof. As can be clearly seen from FIG. 14, the press studs 58 on the upper side of the lattice strip 56 are passed through the anchoring holes 18 at the edges 16 of the two soft top surface elements 12, whereupon the two soft top surface elements 12 are mechanically firmly and sealingly connected to a PUR-casting resin bead element 20, thereby covering over the edges 16. The press studs 58 which project from the lattice strip 56 at the underside thereof serve in particular for firmly anchoring the lattice strip 56 to the PUR-casting resin bead element 20. A certain hinge effect can also be achieved in the case of this structure by virtue of the substantially kidney-shaped cross-sectional configuration of the PUR-casting resin bead element 20.

Figure 15:
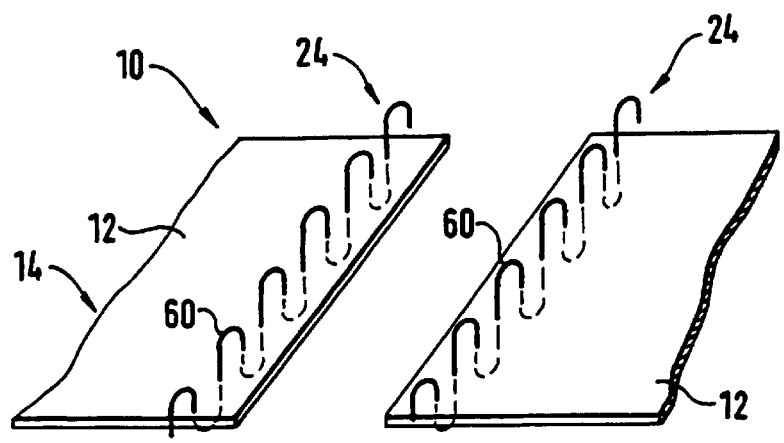
FIG. 15 is a perspective exploded view of yet another embodiment of a part of a soft top according to the invention.

FIG. 15 diagrammatically illustrates a soft top 10 comprising first and second soft top surface elements 12, wherein a strip-shaped connecting element 24 for connecting the elements 12 together is formed by two wire loop elements or wire corrugation elements which are diagrammatically indicated at 60. The wire loop or wire corrugation elements 60 of the two elements 12 are interlocked or interlaced with each other, thereby to interconnect the adjacent elements 12 in mutually aligned relationship.

It will be readily apparent from the above-described alternative configurations of a structure and arrangement according to the invention that a complete vehicle soft top can be produced in accordance with the invention without involving sewing and without a sealing operation following sewing, in a simple, inexpensive, accurate and reproducible manner.

It will further be noted at this point that the invention is not limited merely to a soft top for a motor vehicle, but it can also be used in the same and a similar manner in relation to weather-protection and covering arrangements generally such as tents, heavy goods vehicle or truck covers and the like.

It will be appreciated that the above-described embodiments and configurations according to the invention have been described solely by way of example and illustration thereof and that it is possible to implement a large number of alternative configurations using simple and relatively inexpensive means so that various modifications can be made in the illustrated embodiments without thereby departing from the spirit and scope of the invention.

We claim:

1. A soft top assembly for an automotive vehicle consisting essentially of:
   a soft top surface element having an edge and formed along said edge with spaced-apart anchoring holes;
   a frame assembly linkage element in the form of a circular cross section tube extending along said edge and lying substantially in a common plane with said edge; and
   a strip-shaped polyurethane cast resin bead element surrounding said tube and embedding said edge and passing through said holes, said strip-shaped polyurethane cast resin bead element bridging a gap between said tube and said edge and having a continuously convex contour on one side of said surface element and a concave fillet contour on an opposite side of said surface element.

2. The soft top assembly defined in claim 1 wherein said polyurethane cast resin bead element is composed of a two-component polyurethane.

* * * * *